United States Patent

Rains

Patent Number: 5,803,127
Date of Patent: Sep. 8, 1998

[54] COAXIAL PIPING SYSTEMS

[75] Inventor: Robert L. Rains, Oxnard, Calif.

[73] Assignee: R & R Precision Corp., Oxnard, Calif.

[21] Appl. No.: 758,215

[22] Filed: Nov. 27, 1996

Related U.S. Application Data

[63] Continuation of Ser. No. 625,924, Apr. 1, 1996, abandoned, which is a continuation of Ser. No. 335,662, Nov. 8, 1994, abandoned, which is a continuation of Ser. No. 33,247, Mar. 16, 1993, abandoned, which is a continuation-in-part of Ser. No. 901,536, Jun. 19, 1992, abandoned, which is a continuation of Ser. No. 122,537, Nov. 12, 1987, Pat. No. 5,127,441, which is a continuation of Ser. No. 937,441, Dec. 3, 1986, abandoned, which is a continuation of Ser. No. 809,584, Dec. 16, 1985, abandoned.

[51] Int. Cl.$^6$ .................................................. F16L 9/18
[52] U.S. Cl. ........................... 138/113; 138/114; 138/148
[58] Field of Search .................................. 138/103, 108, 138/111, 113, 114, 115, 148; 48/193

[56] References Cited

U.S. PATENT DOCUMENTS

| | | | |
|---|---|---|---|
| 240,236 | 4/1881 | Delany | 138/113 |
| 314,089 | 3/1885 | Westinghouse | 48/193 |
| 315,443 | 4/1885 | Randol | 48/193 |
| 316,967 | 5/1885 | Heber | 48/193 |
| 321,637 | 7/1885 | Pew | 48/193 |
| 342,143 | 5/1886 | Smith et al. | 48/193 |
| 360,782 | 4/1887 | Ober | 138/114 |
| 445,576 | 4/1891 | Stevens | 138/113 |
| 1,010,140 | 11/1911 | Heer | 48/192 |
| 1,435,555 | 11/1922 | Roberts | 48/193 |
| 2,504,478 | 4/1950 | Whatley | 138/113 |
| 2,756,032 | 7/1956 | Dowell | 138/114 |
| 2,838,074 | 6/1958 | Lauck | 138/114 |
| 2,895,512 | 7/1959 | Forsyth et al. | 138/113 |
| 2,896,669 | 7/1959 | Broadway et al. | 138/113 |
| 2,930,407 | 3/1960 | Conley et al. | 138/114 |
| 2,938,569 | 5/1960 | Goodrich | 138/113 |
| 3,213,889 | 10/1965 | Cotmron | 138/113 |
| 3,332,446 | 7/1967 | Mann | 138/114 |
| 3,399,691 | 9/1968 | Schoch et al. | 137/375 |
| 3,471,177 | 10/1969 | Garrett et al. | 138/114 |
| 3,872,780 | 3/1975 | Zanias | 138/114 |
| 3,974,862 | 8/1976 | Furbrmann | 138/114 |
| 4,182,378 | 1/1980 | Dieter | 138/114 |
| 4,250,927 | 2/1981 | Newbury | 138/114 |
| 4,615,359 | 10/1986 | Affa et al. | 138/114 |
| 4,915,121 | 4/1990 | Rains | 138/114 |
| 4,930,544 | 6/1990 | Ziu | 135/111 |
| 5,069,255 | 12/1991 | Musznski | 138/114 |
| 5,156,191 | 10/1992 | Walker et al. | 138/113 |

FOREIGN PATENT DOCUMENTS

| 0257477 | 6/1988 | Germany | 138/113 |
|---|---|---|---|

*Primary Examiner*—Denise L. Ferensic
*Assistant Examiner*—James F. Hook
*Attorney, Agent, or Firm*—Blakely, Sokoloff, Taylor & Zafman LLP

[57] ABSTRACT

In a coaxial piping system for the transport of toxic and hazardous gases having an inner conduit wherein hazardous gases are transported therethrough and having a spacer that separates the inner conduit from an outer conduit, so that purging gases can flow between the conduits.

9 Claims, 3 Drawing Sheets

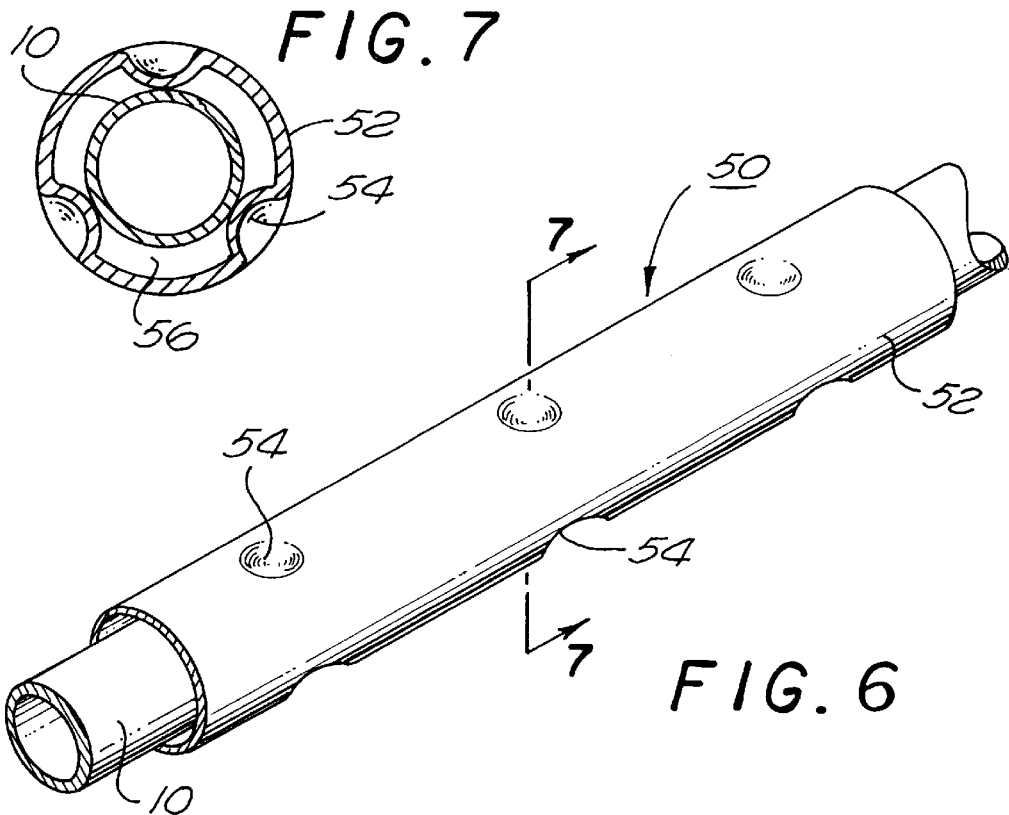
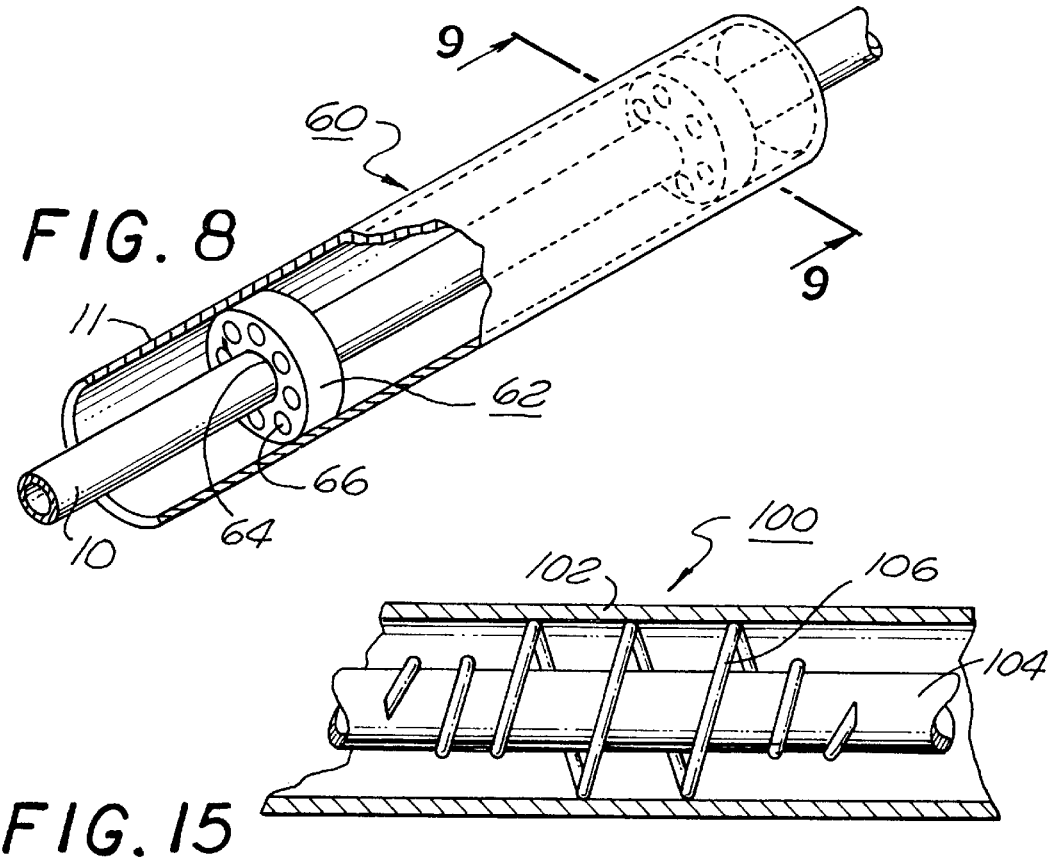

COAXIAL PIPING SYSTEMS

This is a continuation of application Ser. No. 08/625,924 filed on Apr. 1, 1996 now abandoned, which is a continuation of application Ser. No. 08/335,662 filed Nov. 8, 1994 now abandoned, which is a continuation of application Ser. No. 08/033,247 filed on Mar. 16, 1993 now abandoned, which is a continuation in part of prior application Ser. No. 07/901,536 filed on Jun. 19, 1992 now abandoned, which is a continuation of prior application Ser. No. 07/122,537 filed on Nov. 12, 1987 now Pat. No. 5,127,441, which is a continuation of prior application Ser. No. 06/937,441 filed on Dec. 3, 1986 now abandoned, which is a continuation of prior application Ser. No. 06/809,584 filed on Dec. 16, 1985 now abandoned.

BACKGROUND OF THE INVENTION

STATEMENT OF THE RELATED CASES

1. Field of the Invention

The present invention relates to coaxial piping systems for the transportation of toxic and hazardous gases. More particularly, the present invention relates to a coaxial piping system that permits bending of the coaxial pipes without crimping, provides safe purging of escaped gases and reduces stress fractures caused by vibrations.

2. Art Background

Over the years, the transport of toxic and hazardous gases, such as nitrogen, argon, hydrogen, oxygen, silane, phosphine, arsine, plus various mixed gases, via piping systems, has presented a serious problem for engineers, contractors and others who use or effect transportation of these gases. When piping systems are used to transport such gases or fluids from one point to another there always exists the possibility of a leak occurring in the piping system, thereby allowing hazardous or toxic gases to escape, thus presenting the possible risks of death or sickness resulting from inhalation of the gases by persons near the piping system or explosion, should the escaped incendiary gases ignite. It is therefore desirable to have a piping system that can safely transport hazardous materials.

SUMMARY OF THE INVENTION

The present invention overcomes the problems and obstacles contained in the prior art through the discovery of a unique coaxial piping system that prevents crimping of the inner pipe when a coaxial run of piping in bent. The present invention also disperses leaking gas contained in the volume between the inner pipe and the outer pipe by thoroughly mixing the purging gas with the leaking gas. Moreover, the present invention absorbs vibrations in the coaxial piping system thereby preventing such vibrations from causing fractures and leaks in the inner pipe.

Accordingly, the present invention relates to a coaxial piping system for the transport of fluid therethrough, the coaxial piping system having: an outer conduit, an inner conduit disposed within the outer conduit along the longitudinal axis thereof, a means for centering the inner conduit within the outer conduit, the centering means comprising a spacer helically wound about the inner conduit, the coils of the helical spacer being sufficiently spaced apart to permit fluid flow in the volume between the inner conduit and the outer conduit. The purging fluid traveling through the volume between the inner conduit and the outer conduit thoroughly mixes with and disperses the leaking gas present in the volume between the inner conduit and the outer conduit. The spacer also prevents crimping of the inner conduit when the coaxial piping system is bent to conform to the desired conformation of the piping system. In addition, vibrations present in the coaxial piping system are absorbed by the helical spacer, thereby preventing stress fractures in the inner conduit.

Other variations in spacer design are also provided herein. These alternative spacer designs include a variety of devices and arrangements which permit an outer and inner conduit to be arranged coaxially and which also permit a purging gas to flow through the space between the outer and inner conduit.

BRIEF DESCRIPTION OF THE DRAWINGS

FIG. 6 shows an alternate embodiment of a coaxial piping system of the present invention.

FIG. 7 is a cross-sectional view of a spacer taken at line 7—7 of FIG. 6.

FIG. 8 is a sectional view showing an alternate embodiment of a coaxial piping system of the present invention.

FIG. 15 is a partial cross-sectional view of an alternative embodiment coaxial piping system including a spring spacer of varing coil diameter.

DETAILED DESCRIPTION OF THE INVENTION

Figure 1:
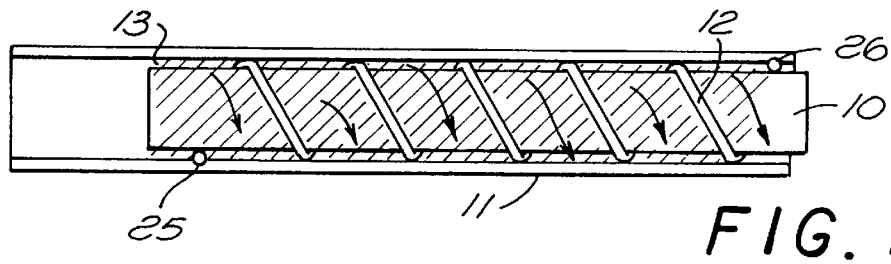
FIG. 1 there is shown a part cross sectional view of the coaxial piping system of the present invention.

In FIG. 1 there is shown a partial cross sectional view of the coaxial piping system of the present invention having an inner conduit 10 with a helical spacer 12 disposed continuously around the inner conduit 10. The inner conduit 10 and the helical spacer 12 are disposed inside an outer conduit 11 as shown in FIG. 1. The thickness of the helical spacer 12 is approximately equal to the distance between the outer wall of the inner conduit 10 and the inner wall of the outer conduit 11 such that the helical spacer 12 snugly fits within the volume 13 between the inner conduit 10 and the outer conduit 11. The snug fit secures the helical spacer 12 in the desired position without requiring any additional means for securing the spacer. The coils of the helical spacer 12 are sufficiently spaced apart from one another to permit fluid communication through the volume 13 between the inner conduit 12 and the outer conduit 11. In another embodiment, the helical spacer 12 may be provided with gripper ends 25 and 26 which are hook like projections that may fit into detents in the outer conduit 11, as shown in FIG. 1, or around projections (not shown) in the outer conduit 11 or inner conduit 10, to prevent the helical spacer 12 from sliding or moving about within volume 13. The inner conduit 10 and the outer conduit 11 may be constructed substantially of metallic material or plastic material such as PVC. The helical spacer 12 may be formed from metallic material such as spring steel or from resilient materials such as rubber, plastic or the like so long as such materials are strong enough to prevent crimping of the inner conduit 10 when the coaxial piping system is bent. The materials should also be resistant to whatever gases or liquids are transported through the piping system.

When a leak develops in the inner conduit 10 the toxic or otherwise hazardous gas transported by the inner conduit 10 escapes into the volume 13 between the inner conduit 10 and the outer conduit 11. It then becomes necessary to purge the coaxial system of the escaped toxic gas. This is accomplished by injecting a purging gas into the volume 13. Purging gases injected into the volume 13 are thereby forced to travel around the inner conduit 10 along the coils of the helical spacer 12, in the direction shown by the arrows shown in FIG. 1, thereby taking a helical path in its travel through the volume 13. This helical path creates a turbulence in the purging gas which thoroughly mixes with pockets of the toxic or hazardous gas that has escaped from a leak in the inner conduit 10, so that a pocket of escaped dangerous gas present in the volume 13 mixes with and disperses into a purging gas traveling through the volume 13.

It will be appreciated that helical spacer 12 also serves the purpose of absorbing vibrations that occur through normal use and where and tear of the coaxial piping system by absorbing and equally distributing such vibrations over the length of the coaxial piping system and substantially preventing the inner conduit 10 from vibrating within the outer conduit 11, thereby preventing stress fractures that would otherwise be caused by such vibrations.

Figure 2:
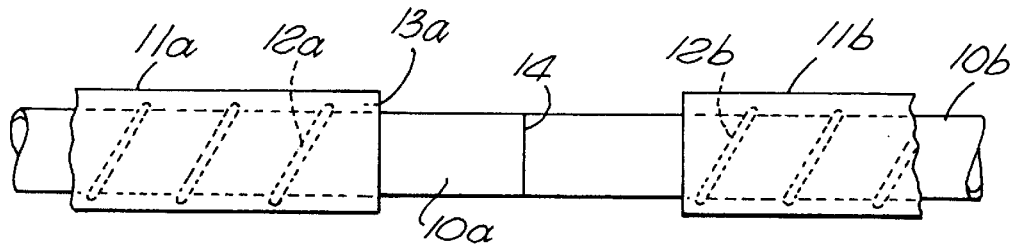
FIG. 2 is a partial cutaway side view of the present invention illustrating the method of constructing the invented coaxial piping system.
Figure 3:
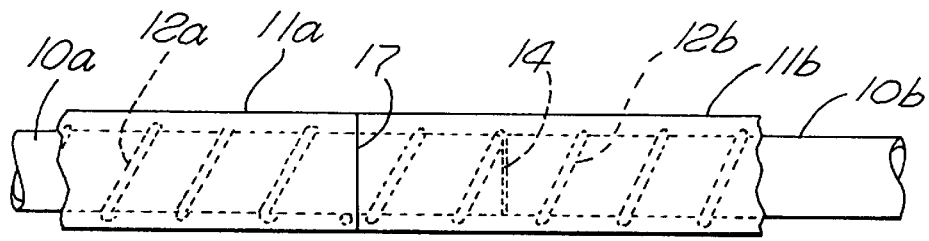
FIG. 3 is a partial cutaway side view of the present invention illustrating the method of constructing the invented coaxial piping system.

FIGS. 2 and 3 illustrates the process of construction of a straight line of coaxial piping embodying the present invention. A first inner conduit 10a is brought into contact with a second inner conduit 10b so that their ends abut at 14. The abutting ends of 10a and 10b are then butt welded together at 14 and leak tested. The outer conduits 11a and 11b having, respectively helical spacers 12a and 12b are slid into position such that their ends abut one another at 17 and so that outer conduit 11b covers the inner conduit weld joint at 14. The abutting ends of the outer conduits 11a and 11b are then welded together, forming a weld joint at 17, and leak tested.

Figure 4:
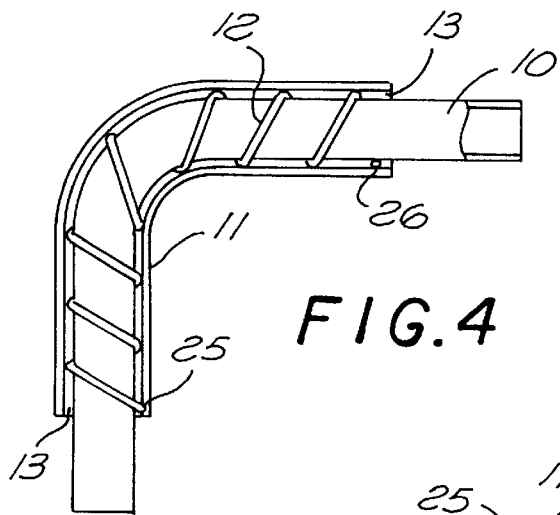
FIG. 4 illustrates a part cross sectional view of an elbow of the coaxial piping system of the present invention.

In FIG. 4 there is shown a partial cross sectional view of an elbow of the coaxial piping system of the present invention. In prior art devices, when such a bend was needed or desired in a coaxial piping system both tubes would be bent together and often an undetected crimp or crack, or at least serious stress, in the inner conduit 10 would occur as a result of the bending. Such crimping that occurred in prior art coaxial piping systems also created a weakening of the inner conduit 10 which led to stress fractures at the crimped points and therefore leaking of the toxic or hazardous gases. The helical spacer 12 prevents crimping of the pipe by uniformly distributing deformation forces evenly along the length of the inner conduit 10 when the coaxial piping is bent. Thus, when a length of coaxial piping of the present invention is bent to form, for example an elbow, as shown in FIG. 4, the radius of curvature of the inner conduit 10 is substantially equal to the radius of curvature of the outer conduit 11, thereby avoiding crimping of the inner conduit 10, and the accompanying stress fractures and leaks therein.

Figure 5:
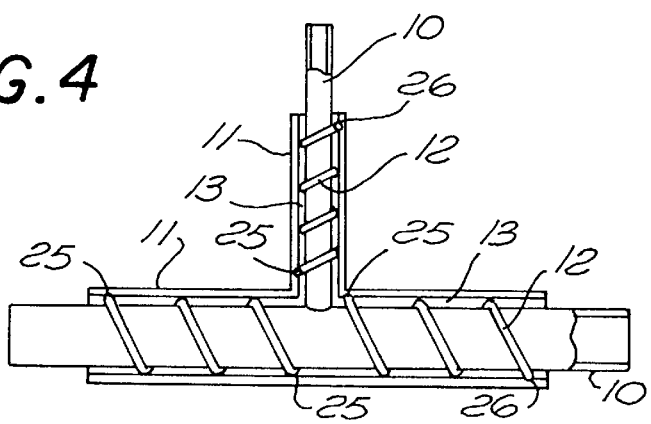
FIG. 5 shows the coaxial piping system of the present invention configured in the form of a T-shape.

In FIG. 5 there is shown a partial cross sectional view of the coaxial piping system of the present invention employed to form a reducing T-shaped coaxial piping system. The structure of FIG. 5 is constructed using similar methods as shown in FIGS. 2 and 3 and as previously discussed.

FIGS. 6 and 7 show an alternate embodiment of a coaxial piping system 50 of the present invention. The system 50 has an outer conduit 52 with a plurality of dimples 54 formed therein. The dimples 54 have an inner surface that is in contact with the outer surface of the inner conduit 10 to support the inner pipe. The dimples 54 are preferably formed during the construction of the outer conduit 52. The dimples 54 create a number of channels 56 that allow fluid flow between the inner and outer conduits. In the preferred embodiment, all of the dimples 54 have the same depth and are symmetrically located around the outer pipe 52, so that the dimples 54 center the inner conduit 10 within the outer conduit 52. The dimples 54 are typically shaped as a segment of a sphere, although it is to be understood that the dimples 54 can be rectangular, triangular or any other suitable shape.

Figure 9:
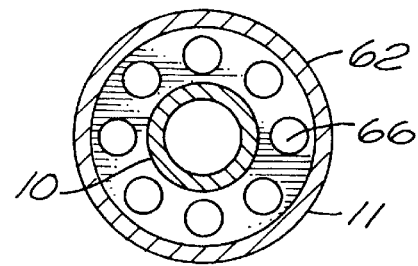
FIG. 9 is a cross-sectional view of a spacer taken at line 9—9 of FIG. 8.

FIGS. 8 and 9 show an another embodiment of a coaxial piping system 60 of the present invention. The system has a number of disk shaped spacers 62 that separate the outer conduit 11 from the inner conduit 10 to create a space between the pipes. Each spacer 62 has an inner bore 64 that is typically in contact with the outer surface of the inner conduit 10. Additionally, the outer surface of the spacers 62 are typically in contact with the inner surface of the outer conduit 11. Each spacer 62 has a plurality of holes 66 that allow fluid to flow through the space between the conduits 10 and 11. In the preferred embodiment, the spacers 62 are constructed from a plastic material that is both lightweight and strong, although it is to be understood that other types of materials such as metal can be employed.

The holes 66 should be of such numbers and dimensions to prevent an excessive pressure drop through the spacers 62. The spacers 62 should be wide enough to distribute the weight of the conduits without creating dimples in the pipes. The distance between each spacer 62 can vary depending upon the type of conduit and the loads typically seen by the system 60.

Figure 10:
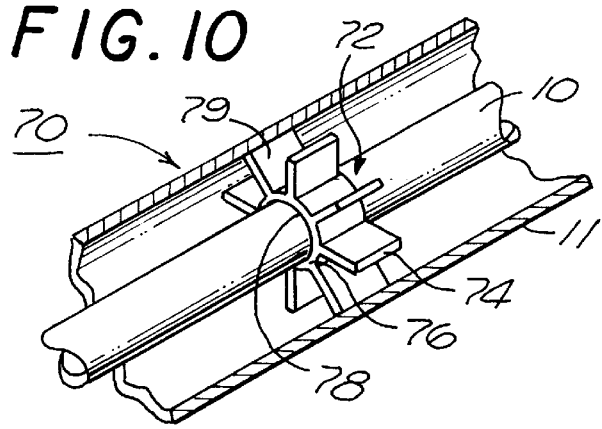
FIG. 10 is a sectional view showing an alternate embodiment of a coaxial piping system of the present invention.

FIG. 10 shows another embodiment of a coaxial piping system 70 of the present invention. The system has a spider type spacer 72 that separates the inner conduit 10 from the outer conduit 11. The spacer 72 has a plurality of legs 74 that extend from a collar 76. The outer ends of the legs 74 are typically in contact with the inner surface of the outer conduit 11. The collar 76 typically has an inner bore 78 with an inner surface that is in contact with the outer surface of the inner conduit 10. The legs 74 define a number of channels 79 that provide fluid communication across the spacer 62. The spider spacer 72 is preferably constructed from stainless steel, but may be formed from any suitable material.

Although four legs 74 are shown, it is to be understood that any number of legs can be used in the spacer 72. The legs 74 may extend perpendicular from the collar 76 as shown in FIG. 10, or at an oblique angle from the collar 76. Locating the legs 74 at an oblique angle would reduce the stiffness and increase the spring rate of the legs. The increased spring rate would improve the vibration absorbing characteristics of the spacer 72. Although the legs 74 are shown as being straight solid members, it is understood that the legs may be twisted or have other configurations.

Figure 11:
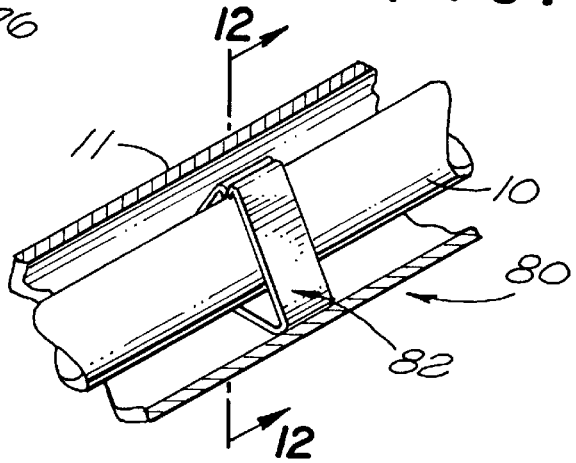
FIG. 11 is a sectional view showing an alternate embodiment of a coaxial piping system of the present invention.
Figure 12:
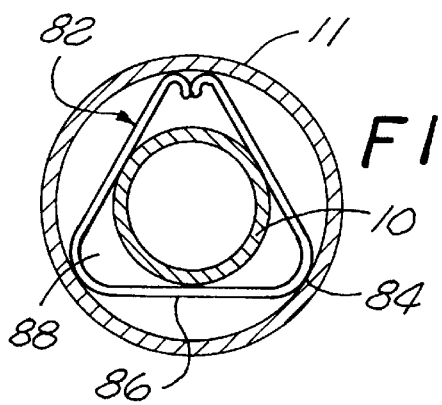
FIG. 12 is a cross-sectional view of a spacer taken at line 12—12 of FIG. 11.

FIGS. 11 and 12 show another embodiment of a coaxial piping system 80 of the present invention. The system 80 has a triangular shaped spacer 82 that separates the inner conduit 10 from the outer conduit 11. The spacer 82 is preferably constructed as a single metal clip that can be placed around the inner conduit 10. The apexes 84 of the triangular shaped clip come into contact with the inner surface of the outer conduit 11. The base portions 86 of the triangular shaped clip are contiguous with the inner conduit 10. The spacer 82 creates a number of inner and outer channels 88 that allow fluid to flow between the conduits. The metal clip spacer 82 provides a member that can be readily attached to the inner conduit 10 during the assembly of the system 80.

Figure 13:
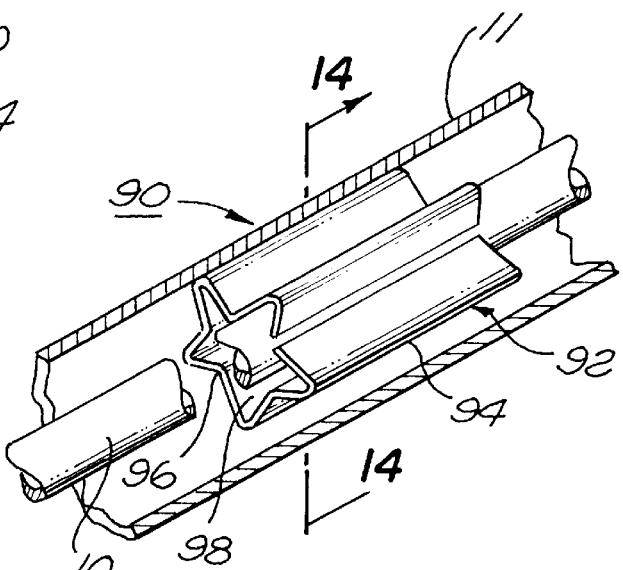
FIG. 13 is a sectional view showing an alternate embodiment of a coaxial piping system of the present invention.
Figure 14:
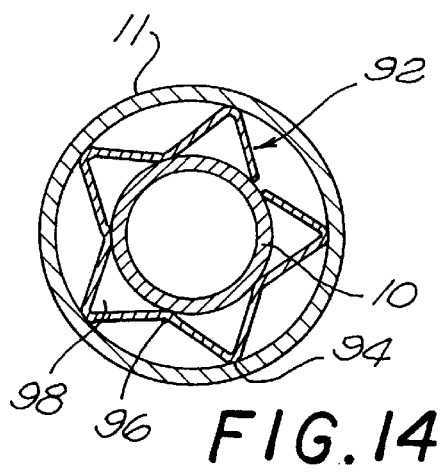
FIG. 14 is a cross-sectional view of a spacer taken at line 14—14 of FIG. 13.

FIGS. 13 and 14 show yet another alternate embodiment of a coaxial piping system 90 of the present invention. The system has a star shaped spacer 92 that separates the inner conduit 10 from the outer conduit 11. The star shaped spacer 92 has a plurality of ridge portions 94 that are in contact with the inner surface of the outer conduit 11, and a number of base portions 96 that are in contact with the outer surface of the inner conduit 10. The spacer 92 creates a plurality of channels 98 that provide fluid communication across the spacer 92. The star shaped spacer 92 is somewhat flexible and constructed to deflect when subjected to shock or a vibrational load. Deflection of the spacer 92 allows the conduits to move relative to each other and reduce the stress in the pipes.

The spacer 92 is preferably constructed from a single sheet of material that has a number of convolutions formed therein in an accordion like fashion. The sheet is then wrapped around the outer surface of the inner conduit 10 to form the spacer 92. The ends of the sheet are preferably left unattached so that the sheet can expand when the spacer is deflected. The width of each spacer 92 can vary depending upon the application of the system. Although five ridge portions 94 are shown, it is to be understood that a spacer 92 having three or more ridge portions can be used in the present invention.

The spacers shown in FIGS. 6–14 separate the conduits so that a purging gas can effectively flow between the pipes. The spacers preferable center the inner conduit within the outer conduit, so that the purging gas can flow around the entire outer surface of the inner pipe. Centering the inner conduit further ensures the removal of all hazardous material that may escape from the inner pipe.

FIG. 15 shows yet another embodiment of a coaxial piping system 100 having an outer conduit 102, an inner conduit 104 and a spacer 106. The spacer 106 has large diameter coil section 108 which extends to the inner surface of the outer conduit 102. The spacer 106 also has a smaller diameter coil section 110 which is sized to tightly hold the inner conduit 104. The spacer is made of a plurality of large diameter coil sections and small diameter coil sections along the length of the outer and inner conduits, the arrangement of the large diameter coil sections and small diameter coil sections with respect to each other being in any arrangement as desired which provides sufficient support for the inner conduit. The spacer is preferably made of steel spring, but any metal or plastic material may be used. In this arrangement the spacer provides a shock absorbing capacity for the inner conduit while supporting it in place within the outer conduit. The spacer is helically wrapped around the inner conduit, but does not completely cover the distance between the outer and inner conduit at any one cross-section. However, because the spacer 106 wraps helically around the conduit it still manages to cause a mixing of gas in the space between the two conduits when gas is pumped or otherwise injected into said space.

Also, it will be appreciated that the present invention may be embodied in other specific forms without departing from the spirit or essential characteristics thereof. The present embodiments are, therefore, to be considered in all aspects as illustrative and not restrictive, the scope of the invention being indicated by the appended claims rather than by the foregoing description and all changes which come within the meaning and range of equivalency are, therefore, intended to be embraced therein.

What is claimed is:

1. A piping system for transporting a hazardous material, for containing leaks of said hazardous material and for flushing said system of the leaks of hazardous material comprising:

an outer conduit having a longitudinal center axis, said outer conduit for containing the leaks;

an inner conduit having a longitudinal center axis, said inner conduit positioned within said outer conduit, wherein said longitudinal center axis of said inner conduit is coincident with said longitudinal center axis of said outer conduit, said inner conduit further being adapted to transport the hazardous material;

a spacer separating said inner conduit from said outer conduit, said spacer having a cross section, said cross section axisymmetric with respect to said longitudinal center axis of said inner conduit and said outer conduit, said spacer further having an inner conduit support means for supporting said inner conduit and an outer surface spacer means for holding said inner conduit away from said outer conduit, and said spacer further defining at least one pathway for providing fluid communication through; and, a purging fluid disposed in a volume between the inner conduit and the outer conduit, the volume defined by the inner conduit, the outer conduit and the spacer, for mixing with and dispersing any leaking said hazardous material present in said volume.

2. The system as recited in claim 1, wherein said spacer has a plurality of holes.

3. The system as recited in claim 1, wherein said spacer is shaped as a disk.

4. The system as recited in claim 1, wherein said spacer is constructed so that said inner conduit is coaxial with said outer conduit.

5. A piping system for transporting a hazardous material, for containing leaks of said hazardous material and for flushing said system of the leaks of hazardous material comprising:

an outer conduit having a longitudinal center axis, said outer conduit for containing the leaks;

an inner conduit having a longitudinal center axis, said inner conduit positioned within said outer conduit, wherein said longitudinal center axis of said inner conduit is coincident with said longitudinal center axis of said outer conduit, said inner conduit further being adapted to transport the hazardous material;

a spacer separating said inner conduit from said outer conduit, said spacer having a cross section, said cross section axisymmetric with respect to said longitudinal center axis of said inner conduit and said outer conduit, said spacer further comprising a collar, the collar having an inner bore adjacent to said inner conduit and at least two legs extending from the collar, said legs being adapted to be in contact with said outer conduit and to define at least two channels that allow fluid communication across said spacer; and, a purging fluid disposed in a volume between the inner conduit and the outer conduit, the volume defined by the inner conduit, the outer conduit and the spacer, for mixing with and dispersing any leaking said hazardous material present in said volume.

6. The system as recited in claim 5, wherein said legs extend essentially perpendicular to said collar.

7. The system as recited in claim 5, wherein said legs extend from said collar at an oblique angle.

8. The system as recited in claim 5, wherein said spacer has four legs.

9. The system as recited in claim 5, wherein said spacer is constructed so that said inner conduit is coaxial with said outer conduit.

* * * * *